(12) United States Patent
Grandry

(10) Patent No.: US 12,552,071 B2
(45) Date of Patent: Feb. 17, 2026

(54) QUALITY VERIFICATION SYSTEM FOR MEASUREMENT OF RAW MATERIALS IN CONTINUOUS METERING PROCESSES USING CALIBRATION WEIGHTS

(71) Applicant: COMPAGNIE GENERALE DES ETABLISSEMENTS MICHELIN, Clermont-Ferrand (FR)

(72) Inventor: Sebastien Grandry, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 649 days.

(21) Appl. No.: 17/973,770

(22) Filed: Oct. 26, 2022

(65) Prior Publication Data
US 2023/0052284 A1    Feb. 16, 2023

(30) Foreign Application Priority Data
Oct. 26, 2021    (FR) ...................................... 2111337

(51) Int. Cl.
*B29B 7/74*    (2006.01)
*B29B 7/60*    (2006.01)
*B29B 7/72*    (2006.01)

(52) U.S. Cl.
CPC ............ *B29B 7/7495* (2013.01); *B29B 7/603* (2013.01); *B29B 7/726* (2013.01)

(58) Field of Classification Search
CPC .......... B29B 7/007; B29B 7/42; B29B 7/726; B29B 7/749; B29B 7/748; B29B 7/7485;
(Continued)

(56) References Cited

U.S. PATENT DOCUMENTS 4,976,904 A * 12/1990 Bilhorn .................. B29C 48/92
425/208
5,527,107 A * 6/1996 Weibel .................. B01F 35/881
366/156.2

(Continued)

FOREIGN PATENT DOCUMENTS

CN    102528960 B    10/2014
CN    106393467 A    2/2017
(Continued)

*Primary Examiner* — Charles Cooley
(74) *Attorney, Agent, or Firm* — VENABLE LLP

(57) ABSTRACT

A system for measurement quality verification may form part of an installation located at a site that manufactures rubber mixtures. The system may include a weighing platform having a scale for determining a weight loss of the metered raw materials, a metering device having a metering hopper that receives the raw materials required for performing one or more rubber mixing processes and a metering device that meters the raw materials into the metering hopper in real time, an application and removal system that allows for application and removal of one or more calibration weights relative to the weighing platform, and a motion system that facilitates reciprocating vertical movement of the metering device. An installation may incorporate the above system, and a continuous metering process may be performed by the installation.

10 Claims, 5 Drawing Sheets

(58) Field of Classification Search
CPC ........... B29B 9/065; B29B 7/845; B29B 7/38;
B29B 7/7461; B29B 7/7495; B29B 7/603;
B29B 7/28; B29B 7/72; B29B 7/88;
B29B 7/90; B29B 7/94; B29B 7/244;
C08J 3/005; C08J 5/18; C08G 63/785;
G01G 13/24
See application file for complete search history.

(56) References Cited

U.S. PATENT DOCUMENTS

| | | | |
|---|---|---|---|
| 5,627,346 A * | 5/1997 | Weibel | B01F 35/881 |
| | | | 177/98 |
| 8,322,907 B2 * | 12/2012 | Amurri | B29C 48/92 |
| | | | 366/156.2 |
| 10,427,326 B2 | 10/2019 | Regelman et al. | |
| 2003/0185094 A1 | 10/2003 | Packard | |
| 2005/0087906 A1 * | 4/2005 | Caretta | B29C 48/2886 |
| | | | 264/211 |
| 2009/0039106 A1 | 2/2009 | Moretto | |
| 2010/0149902 A1 * | 6/2010 | Amurri | B29B 7/7495 |
| | | | 366/76.2 |
| 2023/0052284 A1 * | 2/2023 | Grandry | B29B 7/7495 |

FOREIGN PATENT DOCUMENTS

| | | | | |
|---|---|---|---|---|
| EP | 4173792 A1 * | 5/2023 | ........... | B29B 7/7495 |
| EP | 4117877 B1 * | 8/2025 | | |

* cited by examiner

[Fig. 1]
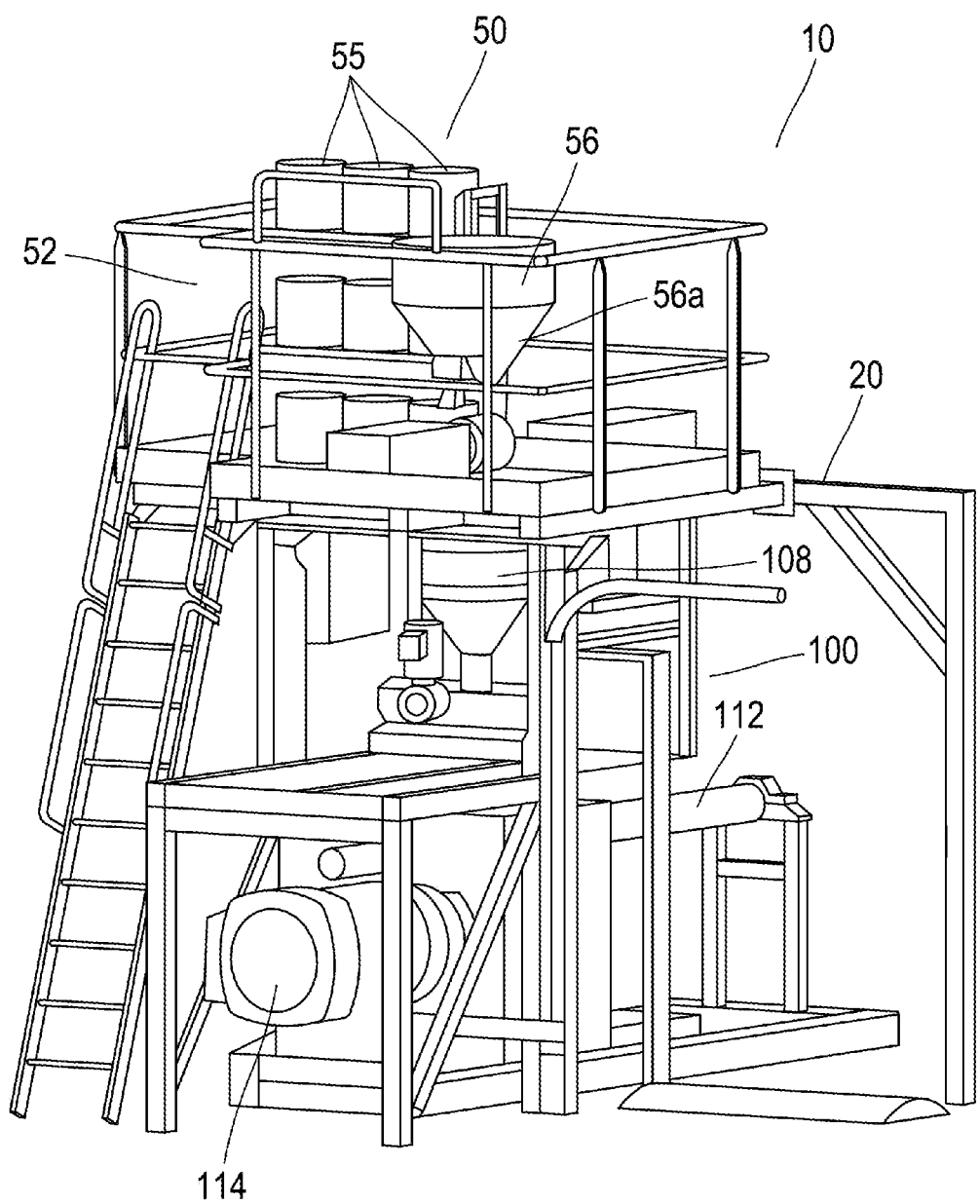

[Fig. 2]
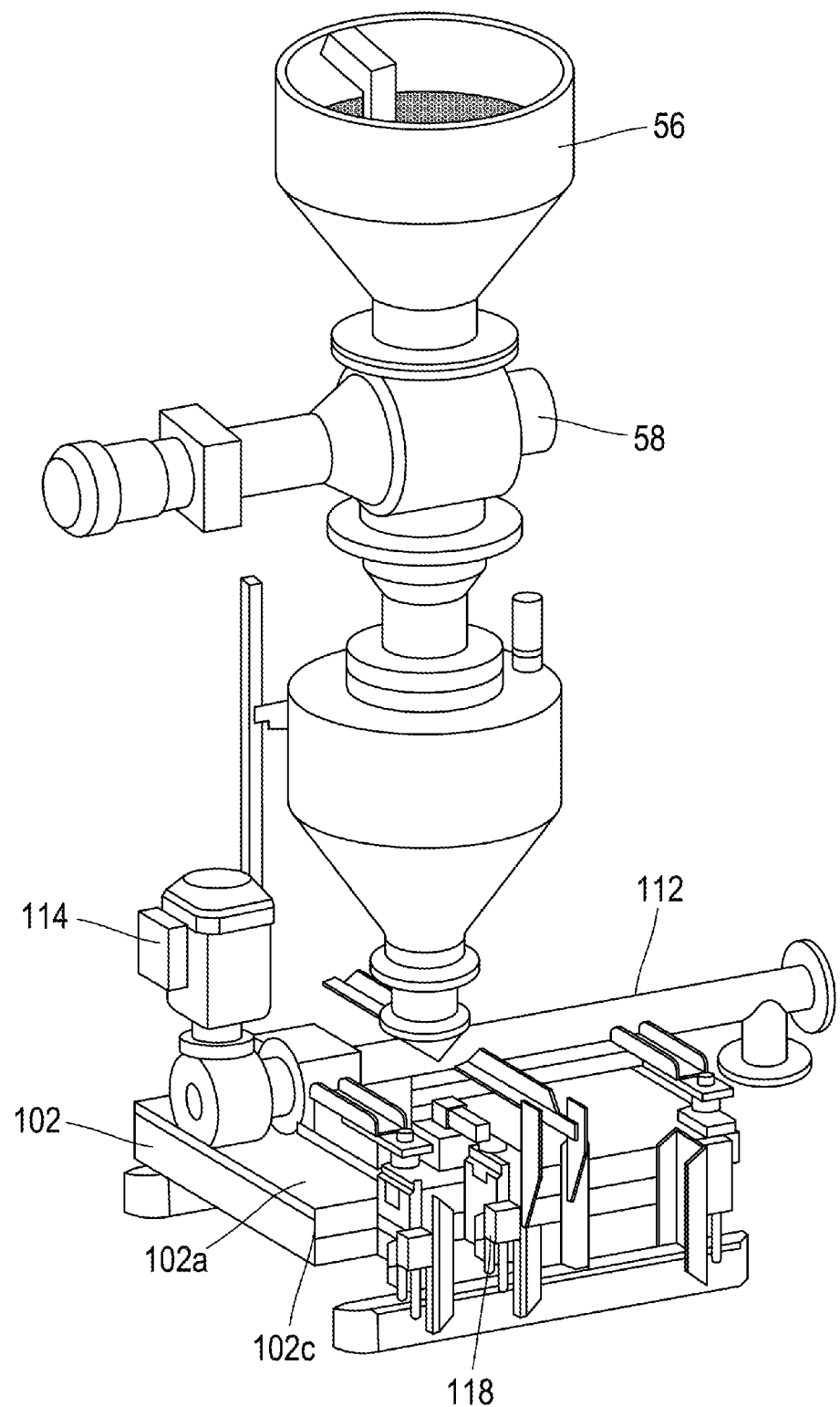

[Fig. 3]
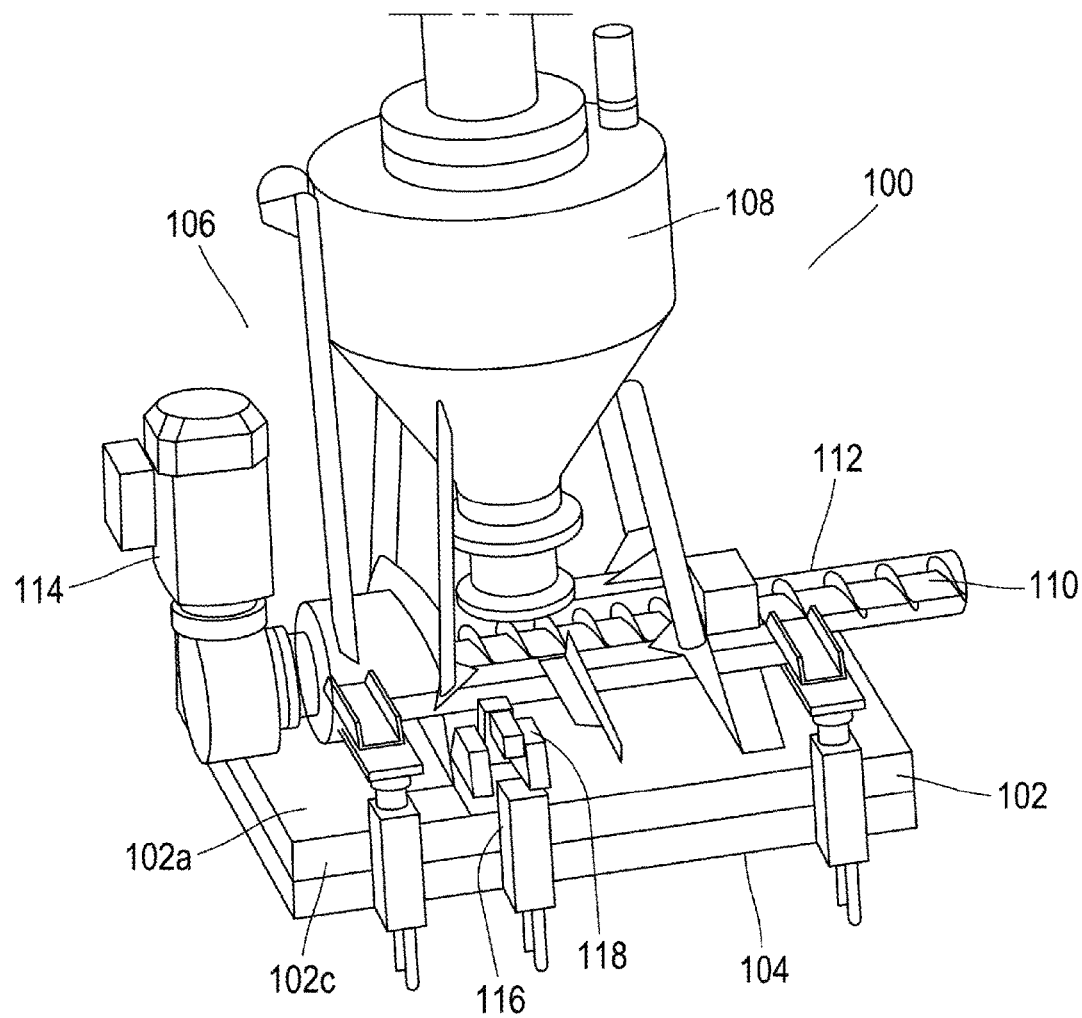

[Fig. 4]
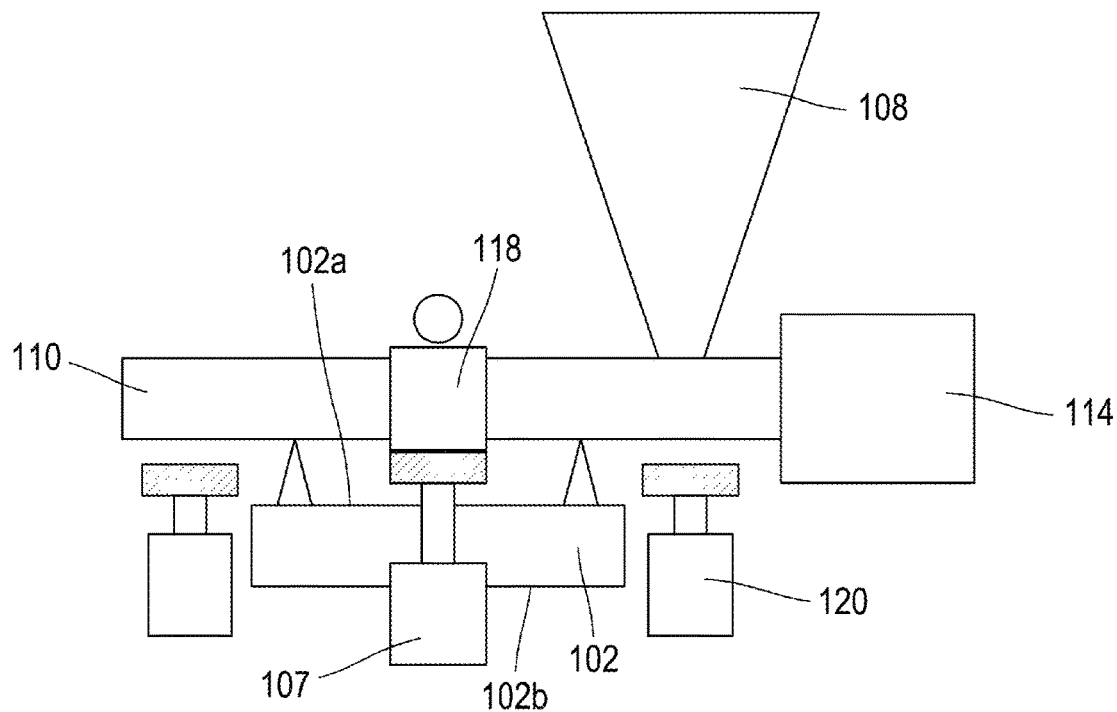
[Fig. 5]
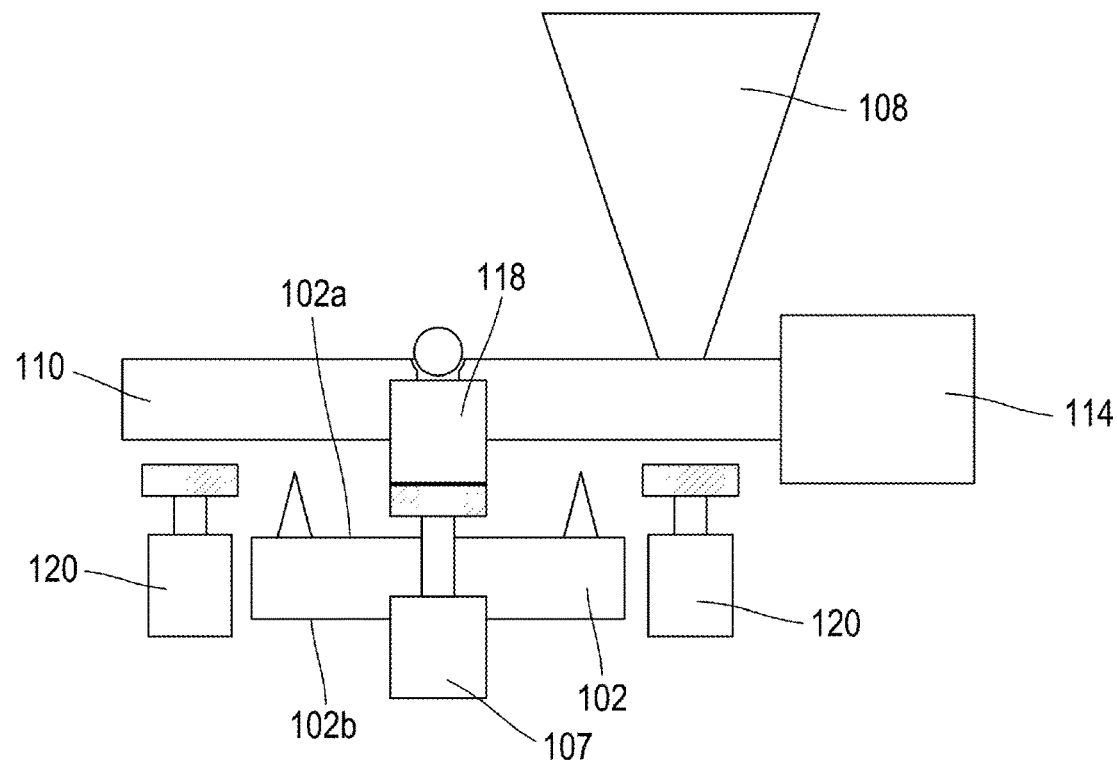

[Fig. 6]
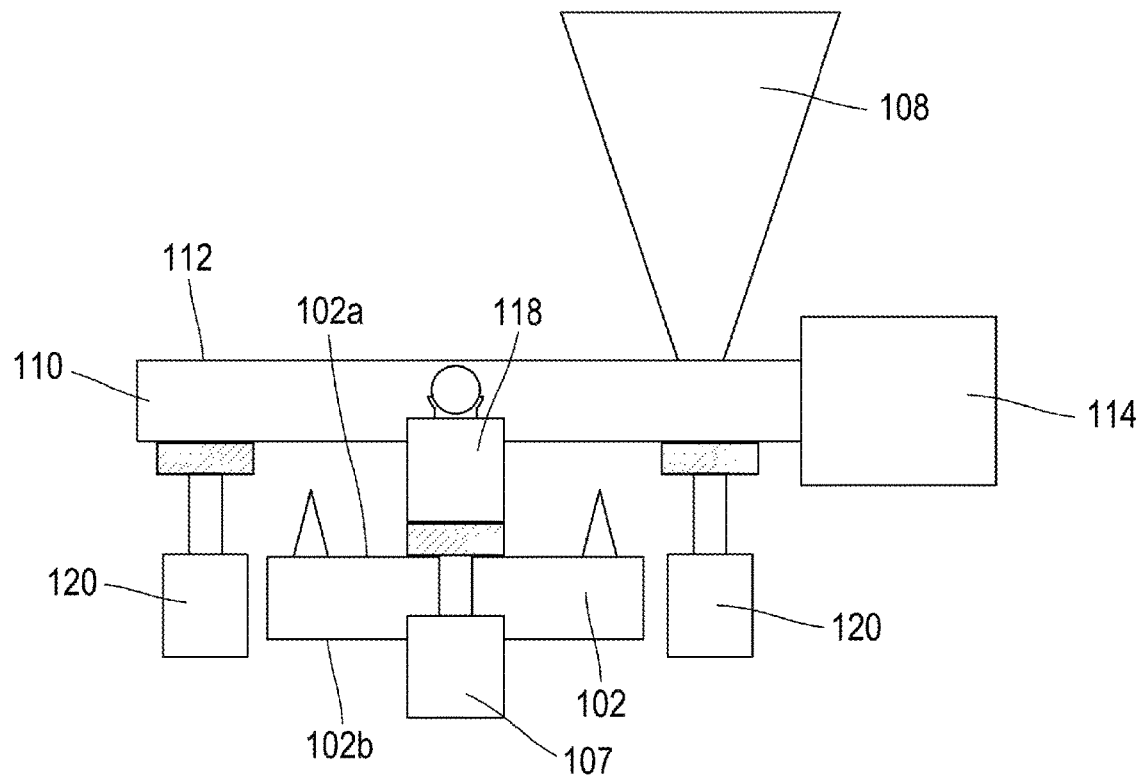
[Fig. 7]
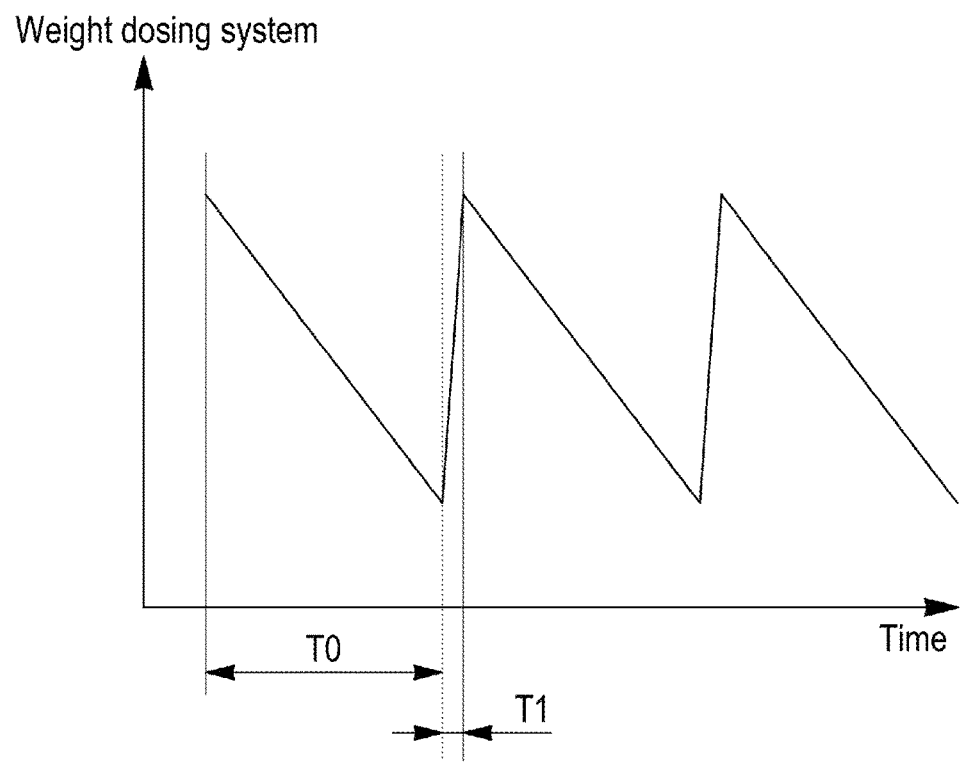

QUALITY VERIFICATION SYSTEM FOR MEASUREMENT OF RAW MATERIALS IN CONTINUOUS METERING PROCESSES USING CALIBRATION WEIGHTS

TECHNICAL FIELD

The invention relates to the control of metering raw materials that are required to perform one or more rubber mixing processes. More particularly, the invention relates to a system for verifying the measurement quality (or "MQV") of such raw materials for continuous metering processes forming part of rubber mixing processes.

BACKGROUND

In the field of production of rubber mixtures, metering systems are used for the dosing of raw materials. These raw materials are different in nature, such as natural and/or synthetic rubbers, reinforcing fillers (such as carbon black and silica), liquid plasticizers (for example, known oils and resins), additives (for example, 6PPD) and vulcanizing agents. In a mixing plant, it is known that there is a wide variety of natures of these raw materials for making the necessary formulations for manufacturing rubber products (including tires). Depending upon the selected formulation, it is necessary to convey the correct quantity by weight of these raw materials at the correct moment. Thus, continuous metering (a process that forms part of rubber mixing processes) is employed for metering the raw materials as regularly as possible to avoid variations in the mixture quality so as to respect the formulation. If the metering device is not sufficiently consistent, the properties of the final rubber product will be adversely affected.

In current metering systems, a machine for receiving the metered product operates continuously. However, the metered product is not accessible, thus rendering impossible any sampling of the material for verification of its measurement.

To attain industrial productivity, the disclosed invention relates to both verifications. The first verification includes a verification of the measurement quality of a measuring instrument, consisting of verifying the operation of a weighing platform while keeping the metering device in a working position. The second verification includes a verification of the quality of the metering, being a complementary measurement of the type "delta of mass during a selected unit of time" with the metering device in position and in weight mode allowing it to validate the complete dosage under industrial use conditions.

SUMMARY OF THE INVENTION

The invention relates to a measurement quality verification system that forms part of an installation located at a site that manufactures rubber mixtures, wherein the system includes:
- a weighing platform including a scale for determining a weight loss of the metered raw materials, the weighing platform having an upper surface, an opposite lower surface and a perimeter;
- a metering device including:
  - a metering hopper that receives the raw materials required for performing one or more rubber mixing processes; and
  - a metering means that meters the raw materials into the metering hopper in real time;
- a calibration weight application and removal system that allows the application and removal of one or more calibration weights with respect to the upper surface of the weighing platform, such that each calibration weight moves in a reciprocating vertical manner between an applied position, in which the at least one calibration weight is placed on the upper surface of the weighing platform, and a removed position, in which the at least one calibration weight is removed from the weighing platform; and
- a motion system that effects reciprocating vertical movement of the metering device, the motion system including at least one lift cylinder for raising the metering device from a lowered position, in which the metering device is disposed on the weighing platform, to a raised position, in which the metering device is no longer disposed on the weighing platform. In certain embodiments of the system of the invention, the metering means of the metering device includes:
- a screw disposed in a sleeve fixed to the installation and placed on the weighing platform; and
- one or more motors that rotate the screw in the barrel during a continuous metering process.

In certain embodiments of the system of the invention, the metering hopper includes:
- a discharge system that discharges the raw materials stored in the metering hopper to the metering means of the metering device; and
- one or more sensors that detect the fill level of the metering hopper, these sensors including one or more sensors for sensing a high level and/or one or more sensors for sensing a low level from within the metering hopper.

In certain embodiments of the system of the invention:
- the motion system includes one or more sensors that detect the lowered position and the raised position of the metering device; and
- the metering device includes one or more sensors that detect when each calibration weight has reached the applied position and the removed position.

In certain embodiments of the system of the invention, the metering device further includes a placement system that permits free reciprocating movement of each calibration weight, the placement system including at least one corresponding lift cylinder disposed along the perimeter of the weighing platform.

The invention also relates to an installation located at a site that manufactures rubber mixtures, wherein the installation includes:
- the disclosed measurement quality verification system;
- a frame that supports the system; and
- a supply station including:
  - a storage zone in which the raw materials required for performing one or more rubber mixing processes are metered during continuous metering processes performed by the system;
  - a supply hopper in which the raw materials stored at the storage zone are introduced to the system; and
  - a sluice equipped with a feeder means that establishes communication between the supply hopper and the metering hopper so as to control a quantity of raw materials introduced to the system via the supply hopper.

The invention further relates to a continuous metering process performed by the disclosed installation, wherein the process includes the following steps:
- a step of performing a measurement quality verification cycle for the metered raw materials, wherein the measurement quality verification cycle includes the following steps:
  - a step of putting the metering device into volumetric mode, during which step a target flow rate of the raw materials stored in the metering hopper is metered;
  - a step of raising the metering device from the lowered position to the raised position, during which step the zero control of the scale is performed;
  - a step of recording the weight value given by the scale, this step being performed once the zero control is obtained during the step of raising the metering device;
  - a step of applying at least one calibration weight to the upper surface of the weighing platform, this step being performed once the zero control is obtained and the weight value given by the scale is recorded;
  - a step of checking the calibration weights including a step of comparing the weight measurement with the expected value of one or more calibration weights; and
  - a step of removing each calibration weight from the weighing platform, during which step each calibration weight is brought into its removed position;
- a step of performing a filling cycle of the metering hopper that occurs during the measurement quality verification cycle, wherein the filling cycle includes the following steps:
  - a step of recording the weight attained just before applying a command to raise the metering device; and
  - a step of calculating the volume and the weight of raw materials to be introduced into the metering hopper, this calculation being based on the target of the high level of the metering hopper by subtracting the recorded weight of raw materials;

such that the filling cycle starts once the zero control is obtained and the weight value given by the scale is recorded.

In certain embodiments of the process of the invention, the filling cycle of the process includes a step of operating the feeder means of the sluice when the calculation indicates a deviation between the high level and the calculated volume and weight on the basis of an estimation of the volume and the weight of raw materials passed through the feeder means of the sluice.

In certain embodiments of the process of the invention, the sluice shuts off as soon as the volume transferred is greater than or equal to the target volume.

In certain embodiments of the process of the invention, the measurement quality verification cycle further includes a step of resting the metering device on the weighing platform.

Further aspects of the invention will become obvious from the following detailed description.

BRIEF DESCRIPTION OF THE DRAWINGS

The nature and various advantages of the invention will become more evident from reading the following detailed description, together with the accompanying drawings, in which the same reference numerals designate identical parts throughout, and in which:

FIG. 1 shows a perspective view of an installation that incorporates a measurement quality verification system (MQV) of the invention.

FIG. 2 shows a perspective view of the MQV system of the invention.

FIG. 3 shows a partial perspective view of the MQV system of FIG. 2.

FIG. 4 shows a schematic view of the MQV system of FIGS. 2 and 3 with a metering device of the system in the lowered position during a measurement quality verification cycle.

FIGS. 5 and 6 show schematic views of the MQV system of FIGS. 2 to 4 with the metering device of the system in the raised position and a calibration weight of the system in the applied position and in the removed position, respectively, during a measurement quality verification cycle.

FIG. 7 is a graph representing the evolution of the weight measurement as a function of time during one cycle of the measurement quality check of a continuous metering process of the invention.

DETAILED DESCRIPTION

Referring now to the figures, in which the same numerals identify identical elements, FIG. 1 shows an installation 10 located at a site that manufactures rubber mixtures (for example, so as to produce one or more rubber-based products, such as tires or parts of tires). The installation 10 includes a frame 20 for supporting a measurement quality verification system (or "MQV system" or "system") 100 of the invention. The MQV system 100 relates to a loss-in-weight metering system, in which the raw materials required for performing one or more rubber mixing processes are metered during continuous metering processes. The frame 20 is provided with sufficient inertia to prevent vibrations that degrade the weight measurement during continuous metering processes.

Still referring to FIG. 1 and also to FIG. 2, the installation 10 includes a supply station 50 in which the raw materials (or "products") are stored to facilitate the supply of the MQV system 100 (as used herein, the terms "raw materials" and "products", in the singular or plural, are interchangeable). The supply station 50 includes a storage zone 52 for the raw materials for metering that include, without limitation, carbon black, silica, chemical products and sulfur. At the storage zone 50, the raw materials can be stored in known containers (for example, in stainless steel or plastic buckets 55 as shown in FIG. 1).

The supply station 50 also includes a supply hopper 56 into which the raw materials stored at the storage zone 50 are fed to the MQV system 100. It is understood that several types of hopper supplies are likely to be used (for example, known "big-bags", silos and their equivalents). The hopper 56 may be equipped with mechanical means for improving the flow of agglomerated products.

The supply station 50 further includes an equipped sluice 58 that establishes communication between the supply hopper 56 and a metering hopper 108 of a metering system (or "metering device") 106 of the MQV system 100 (see FIG. 2). The sluice 58 includes one or more known feeder means for managing the quantity of raw materials introduced to the MQV system 100 via the supply hopper 56 (including, without limitation, a valve, a rotary feeder, a belt conveyor, an Archimedes screw and their equivalents). The supply hopper 56 stores the raw material or materials until the sluice 58 is set in rotation (for example, this rotation is effected when the weight loss indication reaches a minimum level during a continuous metering process performed by the MQV system 100). The supply hopper 56 can accommodate a variety of bulk products depending on the selected rubber mixture recipe. Still referring to FIGS. 1 and 2, and also to FIGS. 3 to 6, the MQV system 100 includes a weighing platform 102 having a scale 104 for determining a weight loss (referred to as "loss in weight") of the metered raw materials. The weighing platform 102 is of the commercially available type, including analogue and digital types.

The MQV system 100 also includes a metering system (or "metering device") 106 having a metering hopper 108 that receives stored raw materials fed through the supply hopper 56 of the supply station 50. Within the metering hopper 108, a known discharge system (not shown) discharges the raw materials to a metering means of the metering device 106. The metering hopper 108 is used to regulate the flow rates of the received raw materials.

The metering hopper 108 is equipped with one or more sensors (not shown) that detect its fill level in order to prevent risks that lead to erroneous metering, including the risk of overloading the weighing platform 102. The sensors may include one or more high level sensors to signal product overflow from the metering hopper 108. These sensors may also include one or more low level sensors to signal emptying of the metering hopper 108. In both cases, the sluice 58 of the supply station 50 may shut off so as to signal a raw material supply problem (for example, in cases where a shortage of raw materials is detected in the supply hopper 56). The metering hopper 108 is large enough to ensure less frequent filling and yet have a total contained weight to use the weighing platform 102 with a limited range that provides a good weighing increment interval.

The metering device 106 also includes a metering means that doses the raw materials into the metering hopper 108 in real time. In the embodiment shown in FIGS. 2 to 6, the metering means includes a screw 110 disposed in a barrel 112 placed on the weighing platform 102 (see FIG. 2 and FIG. 4). One or more motors 114 rotate the screw 110 in the barrel 112 during a continuous metering process. It is understood that there are several commercially available types of screws that are contemplated for use in the metering device 106 depending on the properties of the raw materials being metered. As before for the metering hopper 108, the entire assembly of the metering device 106 (including the screw 110, the barrel 112 and the motors 114) has a total contained weight in order to use the weighing platform 102 with a limited range of measurement that provides a good weighing increment interval.

The sluice 58 of the supply station 50 must allow the metering hopper 108 to be filled sufficiently quickly to limit the time "out of control", but sufficiently slowly to limit the risk of overfilling the metering hopper. The connection between the sluice 58 and the metering hopper 108 must be as flexible as possible (for example, by using a flexible textile or a flexible plastic bag for the connection) to minimize disruption of the weighing performed by the scale 104.

The MQV system 100 also includes a system for applying and removing one or more calibration weights 118 (or "calibration weight system") that allows for the application and removal of one or more calibration weights 118 to/from an upper surface 102a of the weighing platform 102. Each calibration weight 118 includes a mass of standard weight that is used to verify (or "calibrate") the weighing platform 102. Each calibration weight 118 moves in a reciprocating vertical manner between an "applied" position (in which the calibration weight is placed on the upper surface 102a of the weighing platform 102)(see FIG. 6) and a "removed" position (in which the calibration weight is removed from, and is no longer in contact with, the weighing platform 102)(see FIGS. 4 and 5). This movement does not affect the metering of raw materials into a machine for receiving the raw materials metered by the MQV system 100. The applied position and the removed position of each calibration weight 118 are monitored by one or more sensors (not shown) that signal when the calibration weight has reached each position.

One calibration weight 118 is shown in FIGS. 2 to 6, but it is understood that one, two or several calibration weights can be installed with respect to the weighing platform 102. Embodiments of the MQV system 100 having two or more calibration weights allow for multiple points of verification of proper operation of the scale 104.

The MQV system 100 further includes a motion system that performs reciprocating vertical movement of the metering device 106 (including the metering hopper 108, the screw 110 and the motor 114). The motion system includes at least one lift cylinder 120 disposed along a front surface 102b of the weighing platform 102. The motion system enables raising of the metering device 106 (and particularly the screw 110) from a lowered position (in which the metering device 106 is disposed on the weighing platform 102) (see FIG. 4) to a raised position (in which the metering device 106 is no longer disposed on the weighing platform 102)(see FIGS. 5 and 6) during a measurement quality verification cycle of a continuous metering process of the invention. The lowered position and the raised position of the metering device 106 are monitored by one or more sensors (not shown) that signal when the metering device has reached each position.

Still referring to FIGS. 4 to 6, a detailed description of a continuous metering process (or "process)" of the invention is given by way of example.

Upon initiating a continuous metering process of the invention, the continuous metering process includes a step of performing a measurement quality verification cycle (or "MQV cycle") for the metered raw materials. The MQV cycle includes a step of setting the metering device 106 into volumetric mode because weighing is no longer possible (see FIG. 4). During this step, the discharge system of the metering hopper 108 operates at a fixed speed based on the speed necessary for maintaining the target flow rate of the raw materials stored in the metering hopper. This speed has been calculated during operating phases prior to the start of the measurement quality verification cycle.

The MQV cycle of the process of the invention also includes a step of raising the metering device 106 from its lowered position to its raised position (see FIG. 5). During this step, zero control of the scale 104 is performed when the metering device 106 is in the raised position. This control is useful for verifying the state of cleanliness of the weighing platform 102. A small quantity of raw materials is tolerated to prevent a malfunction in the filling of the metering hopper 108 (for example, underfilling of the metering hopper 108 during a filling step or cycle).

The MQV cycle of the process of the invention further includes a step of recording the weight value given by the scale 104. This step is performed once the zero control is obtained during the step of raising the metering device 106. The weight value given by the scale 104 during this step represents a weight of raw materials on the weighing platform 102 that is considered during a step of filling the metering hopper 108. As an example, if there is one kilogram of raw materials on the weighing platform 102, and the target filling value is 50 kilograms, the metering hopper 108 could accept up to 49 kilograms when it is next filled so as to stay within the predetermined limit. Thus, the scale 104 does not need to be zeroed between each cycle because the current recorded weight serves as "zero".

The MQV cycle of the process of the invention further includes a step of applying at least one calibration weight 118 to the upper surface 102a of the weighing platform 102 (see FIG. 6). This step is performed once the zero control is obtained and the weight value given by the scale 104 is recorded. It is understood that the zero control includes instances where the actual recorded weight serves as zero (as described below with respect to the filling cycle of the metering hopper 108). During this step, each calibration weight 118 is applied to the weighing platform 102 by means of a placement system of the metering device 106 that ensures that the weighing platform 102 does not influence the measurement when the calibration weights 118 have been completely applied and removed. The placement system includes at least one lift cylinder 107 disposed along a perimeter 102c of the weighing platform 102 that allows free reciprocating movement of the calibration weight 118.

The MQV cycle of the process of the invention further includes a step of checking the calibration weights that includes a step of comparing the weight measurement with the expected value of the one or more calibration weights 118. This step is performed once the calibration weight or weights 118 have been applied to the weighing platform 102 and when the weight measurement stability is attained. If the weight read by the scale 104 is outside a predetermined tolerance range, the measurement quality verification has failed: the MQV system 100 is considered non-compliant for producing the rubber products from the weighed raw materials.

After the calibration weights have been checked, the MQV cycle of the process of the invention further includes a step of removing each calibration weight 118 from the weighing platform 102 (see FIG. 5). During this step, the lift cylinder(s) 107 of the placement system bring(s) each corresponding calibration weight 118 into its removed position (see FIG. 5). The removed position of each calibration weight 118 is obtained after the stabilization of the measurement. An automated control system (not shown) checks the zero at the end of the measurement quality verification cycle. The aim of this automated control system is to verify the hysteresis of the measurement. By way of example, if the zero is equal to the starting zero (+/−1 to 3 intervals), and if the calibration weight(s) 118 are correct, then the measurement process is declared to be compliant. If the zero is not equal to the starting zero, the MQV system 100 is considered non-compliant.

The continuous metering process also includes a step of performing a filling cycle of the metering hopper 108 that occurs during the MQV cycle. Particularly, the filling cycle starts once the zero control is obtained and the weight value given by the scale 104 is recorded. The performance of the filling cycle with the MQV cycle at this stage limits the total time out of control.

The filling cycle of the metering hopper 108 includes a step of recording the value of the recorded weight just before the metering device 106 is in its raised position (see FIGS. 5 and 6). This step is performed just before applying a command to raise the metering device 106 to ensure that the scale correctly measures the weight of the metering device, the hopper and the product.

The filling cycle of the metering hopper 108 also includes a step of calculating the volume and the weight of raw materials to be introduced into the metering hopper. This calculation is based on the target of the high level of the metering hopper 108 by subtracting the recorded weight of raw materials. As an example, if the weight recorded during the preceding step is 5 kg, and if the target fill level of the hopper 108 is 50 kg, the maximum weight introduced into the hopper is 45 kg.

In the event that the calculation indicates a deviation between the high level and the calculated volume and weight, the filling cycle of the process includes a step of putting into operation the feeder means of the sluice 58. During this step, the calculation of the volume and the weight of raw materials introduced is performed on the basis of information provided by one or more sensors giving an estimation of the volume and the weight of raw materials passed through the feeder means of the sluice 58. As an example, at least one sensor may be a sensor for detecting the number of revolutions effected, giving a pulse each time a predetermined volume of raw materials passes through the feeder means of the sluice 58. During this step, the sluice 58 shuts off as soon as the volume transferred is greater than or equal to the target volume. The shut-off of the feed may be caused by the triggering of an excessively high level in the metering hopper 108.

If the MQV cycle is successful, the filling cycle further includes a step of resting the metering device 106 on the upper surface 102a of the weighing platform 102 (see FIG. 4). If there are no faults with the metering hopper being too high, and if the scale 104 is not in an overloaded state when the metering device 106 comes back into contact with the upper surface 102a of the scale at the end of the filling cycle of the metering hopper 108, the compliance of the filling is recognized. At this stage, if the filling cycle has already ended, the metering device 106 reverts to weight mode in order to obtain the target flow rate. If the filling cycle has not ended, the metering device 106 waits for the end of the filling cycle before switching back to weight mode.

If a first MQV cycle fails, the cycle may be repeated. In the event of a second failure, an operator intervention may be required.

Several raw materials can be provided in accordance with the selected mixture recipe. The metered amounts of raw materials are generally delivered in grams for a predetermined time period (for example, in grams per minute). Within an allotted metering cycle time, the weights of the various raw materials are controlled in accordance with the specifications of the rubber mixture recipe.

It is understood that introduction of raw materials to the MQV system 100 can be performed either all at once or in an offset manner depending on the selected rubber mixture recipe, without loss of raw materials.

Referring to FIG. 7, the MQV cycle of the process is effected during a predetermined time T1 in which the loss in weight is not active (see FIG. 4 in which the metering device 106 is in the lowered position). During this time T1, the filling of the metering hopper 106 can be effected so that the MQV control can be performed during the filling. Thus, it is understood that the time for the measurement quality verification cycle performed by the MQV system 100 must be quicker than the filling time of the metering hopper to ensure a good measurement quality without degrading the time under control.

The MQV system 100 performs measurement quality verification while maintaining the customary quality guarantee without stopping the continuous metering. Consequently, the MQV system 100 improves the quality guarantee by virtue of the possibility of increasing the verification frequency, since the measurement quality verification cycle is automatic and concurrent with the filling.

It is understood that one or more steps of the continuous metering process of the invention may be performed iteratively as a function of the selected mixture recipe.

The metering processes of the invention may be performed by PLC control (or any other command/control system) and may include pre-programmed control information. For example, a process setting may be associated with the weights of raw materials provided during the measurement steps, the speed of the screw 110 and the properties of the product exiting the metering device 106.

For all embodiments, a monitoring system could be implemented in any part of the MQV system 100. At least one part of the monitoring system may be supplied in a portable device such as a mobile network device (for example, a mobile telephone, a laptop computer, a camera, one or more portable devices connected to the network (including "augmented reality" and/or "virtual reality" devices, portable clothing connected to the network and/or any combinations and/or any equivalents)).

In embodiments of the invention, the MQV system 100 (and/or the installation 10 that incorporates the MQV system 100) may receive voice commands or other audio data (representing, for example, a command to start or stop a step of the metering process). The demand may include a demand for the current state of a metering process, including a verification of the compliance of the scale 104 and/or of the metering hopper 108. A generated response may be represented audibly, visually, in a tactile manner (for example, by way of a haptic interface) and/or in a virtual and/or augmented manner.

In an embodiment, the process of the invention may include a step of training the MQV system 100 (or training the installation 10 that incorporates the MQV system 100) to recognize representative values of the metered raw materials (for example, volume and weight values) and to perform a comparison with target values. This step may include the step of training the MQV system 100 to recognize a lack of equivalence between the compared values. Each training step may include a classification generated by self-learning means. This classification may include, without limitation, the parameters of the raw materials and their target values attained at any instant of the continuous metering process, the durations of the measurement quality verification and filling cycles, and the values attained at the end of an ongoing continuous metering process. It is conceivable that detection and comparison steps can be performed iteratively. In embodiments of the process of the invention, the data obtained may feed one or more neural networks that manage the MQV system 100 and/or the installation 10 that incorporates the MQV system 100.

The disclosed invention makes it possible to verify measurement quality without stopping the metering of the raw materials required for producing rubber mixtures. The metering is performed continuously while maintaining the industrial quality guarantee. Therefore, the MQV system 100 limits product and production losses linked to the stop and restart of a machine receiving the metered raw materials.

The terms "at least one" and "one or more" are used interchangeably. The ranges given as lying "between a and b" encompass the values "a" and "b".

Although particular embodiments of the disclosed apparatus have been illustrated and described, it will be appreciated that various changes, additions and modifications can be made without departing from either the spirit or scope of the present description. Therefore, no limitation should be imposed on the scope of the invention described, apart from those set out in the appended claims.

The invention claimed is:

1. A system for measurement quality verification that forms part of an installation located at a site that manufactures rubber mixtures, the system allowing raw materials to be metered, the system comprising:
   a weighing platform comprising a scale for determining a weight loss of the raw materials, the weighing platform comprising an upper surface, an opposite lower surface and a perimeter;
   a metering device comprising:
      a metering hopper that receives enough of the raw materials that is required for performing one or more rubber mixing processes; and
      a metering means that meters the raw materials into the metering hopper in real time;
   a system for applying and removing one or more calibration weights that allows application and removal of the one or more calibration weights relative to the upper surface of the weighing platform, such that each of the one or more calibration weights moves in a reciprocating vertical manner between an applied position, in which the one or more calibration weights are placed on the upper surface of the weighing platform, and a removed position, in which the one or more calibration weights are removed from the weighing platform; and
   a motion system that performs reciprocating vertical movement of the metering device, the motion system comprising at least one lift cylinder for raising the metering device from a lowered position, in which the metering device is disposed on the weighing platform, to a raised position, in which the metering device is no longer disposed on the weighing platform.

2. The system of claim 1, wherein the metering means of the metering device comprises:
   a screw disposed in a barrel fixed to the installation and placed on the weighing platform; and
   one or more motors that rotate the screw in the barrel during a continuous metering process.

3. The system of claim 1, wherein the metering hopper comprises:
   a discharge system that discharges the raw materials stored in the metering hopper to the metering means of the metering device; and
   one or more sensors that detect a fill level of the raw materials in the metering hopper, the sensors comprising one or more sensors for sensing, from within the metering hopper, a high level of the raw materials in the metering hopper or one or more sensors for sensing, from within the metering hopper, a low level of the raw materials in the metering hopper.

4. The system of claim 1, wherein the motion system comprises one or more sensors that detect the lowered position of the metering device and the raised position of the metering device; and
   wherein the metering device comprises one or more sensors that detect when each calibration weight of the one or more calibration weights has reached an applied position on the weighing platform or a removed position from the weighing platform of each respective calibration weight of the one or more calibration weights.

5. The system of claim 1, wherein the metering device further comprises a placement system that permits free reciprocating movement of each calibration weight of the one or more calibration weights, the placement system comprising at least one corresponding lift cylinder disposed along the perimeter of the weighing platform.

6. An installation located at a site that manufactures rubber mixtures, wherein the installation comprises:
- the system for measurement quality verification of claim 1;
- a frame supporting the system; and
- a supply station comprising:
  - a storage zone in which the raw materials required for performing one or more rubber mixing processes are metered during continuous metering processes performed by the system;
  - a supply hopper in which the raw materials stored at the storage zone are introduced to the system; and
  - a sluice equipped with a feeder means that establishes communication between the supply hopper and the metering hopper so as to manage a quantity of the raw materials introduced to the system via the supply hopper.

7. A process of continuous metering performed by the installation of claim 6, the process comprising the following steps:
- a step of performing a measurement quality verification cycle for the raw materials, wherein the measurement quality verification cycle comprises the following steps:
  - a step of putting the metering device into volumetric mode, during which step a target flow rate of the raw materials stored in the metering hopper is metered;
  - a step of raising the metering device from the lowered position to the raised position, during which step a zero control of the scale is performed;
  - a step of recording a weight value of the raw materials given by the scale, the step of recording the weight value being performed once the zero control is obtained during the step of raising the metering device;
  - a step of applying at least one of the one or more calibration weights to the upper surface of the weighing platform, this step being performed once the zero control is obtained and once the weight value given by the scale is recorded;
  - a step of checking the one or more calibration weights including a step of comparing the weight value with an expected value of the one or more calibration weights; and
  - a step of removing each calibration weight of the one or more calibration weights from the weighing platform, during which each calibration weight of the one or more calibration weights is brought into the removed position of each respective calibration weight of the one or more calibration weights; and
- a step of performing a filling cycle of the metering hopper that occurs during the measurement quality verification cycle, wherein the filling cycle comprises the following steps:
  - a step of recording a value for a volume and a weight of raw materials inside the metering hopper, which is performed just before applying a command to raise the metering device; and
  - a step of calculating a volume and a weight of the raw materials to be introduced into the metering hopper, a calculation thereof being target values for a volume and a weight of the raw materials that would be in the metering hopper at a high level minus the values for the volume and the weight of the raw materials inside the metering hopper, which were previously recorded in the step of recording a weight of the raw materials inside the metering hopper, wherein the filling cycle starts once the zero control is obtained and once the weight value given by the scale is recorded.

8. The process of claim 7, wherein the filling cycle of the process comprises a step of operating the feeder means of the sluice when the calculation, taken during the step of calculating the volume and the weight of the raw materials to be introduced into the metering hopper, indicates a deviation between the volume and the weight of the raw materials that would be in the metering hopper at the high level and the volume and the weight that is calculated based on an estimation of a volume and a weight of the raw materials passed through the feeder means of the sluice.

9. The process of claim 8, wherein the sluice shuts off as soon as the volume transferred is greater than or equal to the volume of the raw materials to be introduced into the metering hopper, which was previously calculated during the step of calculating the volume and the weight of the raw materials to be introduced into the metering hopper.

10. The process of claim 7, wherein the measurement quality verification cycle further comprises a step of resting the metering device on the weighing platform.

\* \* \* \* \*